United States Patent
Chiou

(10) Patent No.: US 8,955,752 B2
(45) Date of Patent: Feb. 17, 2015

(54) AUTOMATIC TESTING SYSTEM AND AUTOMATIC TESTING METHOD FOR TESTING BARCODE IDENTIFICATION APPARATUS

(75) Inventor: Hann-Huei Chiou, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 562 days.

(21) Appl. No.: 12/831,093

(22) Filed: Jul. 6, 2010

(65) Prior Publication Data

US 2011/0073647 A1 Mar. 31, 2011

(30) Foreign Application Priority Data

Sep. 25, 2009 (CN) .......................... 2009 1 0175754

(51) Int. Cl.
*G06K 7/10* (2006.01)
*G06K 7/14* (2006.01)

(52) U.S. Cl.
CPC ............ *G06K 7/10544* (2013.01); *G06K 7/146* (2013.01); *G06K 7/1465* (2013.01); *G06K 7/1095* (2013.01)
USPC ............ 235/462.01; 235/462.06; 235/462.09; 235/462.1; 235/462.11; 235/462.41

(58) Field of Classification Search
CPC ............ G06K 7/10851; G06K 7/1095; G06K 7/1465; G06K 7/146
USPC .............. 235/462.01, 462.09, 462.14, 462.41
See application file for complete search history.

(56) References Cited

U.S. PATENT DOCUMENTS

| | | | | | |
|---|---|---|---|---|---|
| 4,449,052 | A | * | 5/1984 | Krieg ............................. | 250/568 |
| 5,939,699 | A | * | 8/1999 | Perttunen et al. ......... | 235/462.01 |
| 2007/0119944 | A1 | * | 5/2007 | Cai ........................... | 235/462.25 |
| 2008/0176543 | A1 | * | 7/2008 | Gravel et al. ............... | 455/414.2 |
| 2009/0026267 | A1 | * | 1/2009 | Wang et al. .................... | 235/440 |
| 2009/0072035 | A1 | * | 3/2009 | Ota ........................... | 235/462.16 |

* cited by examiner

*Primary Examiner* — Christopher Stanford

(57) ABSTRACT

An automatic testing method applied to an automatic testing system for testing a barcode identification apparatus is described. In the method, a test host is utilized to generate a barcode pattern automatically, so as to display the barcode pattern through a barcode revealing apparatus. The barcode identification apparatus reads and resolves the barcode pattern to retrieve an identification result. The identification result is returned to the test host. The test host compares the barcode information carried by the barcode pattern and the identification result, and generates a test result. The test host repetitively generates the barcode pattern for a barcode identification apparatus carried the barcode pattern and the identification result, and then generates a test result. Through the test host repeatedly generates the barcode pattern and records the corresponding test result, manual operation is not required to obtain testing data for being analyzed.

21 Claims, 7 Drawing Sheets

AUTOMATIC TESTING SYSTEM AND AUTOMATIC TESTING METHOD FOR TESTING BARCODE IDENTIFICATION APPARATUS

BACKGROUND OF THE INVENTION

1. Field of Invention

The present invention relates to a test of a reading capability of a barcode identification apparatus, and more particularly to an automatic testing system and method for testing a barcode identification apparatus.

2. Related Art

In the prior art, after capturing image of a barcode pattern, the barcode identification apparatus first performs a binarization process and barcode comparison to obtain barcode information and then transfers the barcode information to another host for utilizing the barcode information.

In order to ensure a normal operation of a barcode identification apparatus, the barcode identification apparatus must undergo a test to find out whether the barcode identification apparatus can resolving the barcode pattern within a threshold time and to analyze an accuracy of the barcode reading. Furthermore, the tolerance of the barcode identification apparatus for external factors causing barcode pattern deformations such as defilement, blur, and skewed barcode patterns can be learned through the test, so that a designer of the barcode identification apparatus can improve software or hardware for the barcode identification apparatus again.

According to a method for testing a barcode identification apparatus in the prior art, a barcode chart having plural barcode patterns is provided to be read by the barcode identification apparatus. The barcode patterns on the barcode chart can be divided into different barcode types, or the barcode patterns are substantially the same barcode pattern but varied according to environment variables, such that environment variables such as a size, print density, print contrast, and a barcode defect are changed for different barcode patterns. For the environment variables above, when the barcode pattern is printed, the image quality is adjusted, so that each barcode pattern may simulate one environment variable.

During the test of the barcode identification apparatus, the barcode identification apparatus must be manually operated to read every barcode pattern in the barcode chart one by one, and the identification result is manually interpreted to determine whether the result is correct, so as to confirm that the barcode identification apparatus can work normally. The test of the influences of environment variables is normally performed for only one variable, and one group of the barcode pattern is selected for the test.

During the test of the barcode identification apparatus, no matter for confirmation of whether the barcode identification apparatus can work normally or for analysis of characteristics of the barcode identification apparatus, the barcode identification apparatus has to be manually operated, whether the identification result is correct has to be manually interpreted, and the identification result is recorded manually. The manual test method cannot provide massive data for making statistical analysis in a short period and is not easy for testing mixed variables (mixed variables greatly increase the number of times of the test). Therefore, at present, the test of the barcode identification apparatus is mainly performed for simple test contents.

SUMMARY OF THE INVENTION

The test method in the prior art cannot provide a complicated test of the barcode identification apparatus. Therefore, the present invention provides a test system for testing a barcode identification apparatus and an automatic testing method, in which a barcode identification apparatus can automatically test to collect massive data for analysis.

The automatic testing system for testing a barcode identification apparatus according to the present invention includes a barcode revealing apparatus, a barcode identification apparatus, and a test host. The barcode revealing apparatus reveals a barcode pattern containing barcode information. The barcode identification apparatus reads a barcode pattern and resolves the barcode information carried by the barcode pattern to output an identification result. The test host generates the barcode pattern to be output to the barcode revealing apparatus, receives the identification result output by the barcode identification apparatus, and compares the barcode information carried by the barcode pattern and the identification result to generate a test result. The barcode revealing apparatus is electrically connected to the test host to reveal the barcode pattern for being read by the barcode identification apparatus. The connecting interface is used to establish communication between the barcode identification apparatus and the test host. Through the communication established through the connecting interface, the test host can send a trigger signal to activate the barcode identification apparatus to start to read the barcode pattern and revolve the barcode information carried by the barcode pattern. Meanwhile, the identification result can be transferred to the test host through communication between the barcode identification apparatus and the test host, so that the test host records data and performs a next test procedure.

The present invention further provides an automatic testing method for testing the barcode identification apparatus. According to the automatic testing method, communication between the test host and the barcode identification apparatus is first established. Then, the test host generates a barcode pattern carrying the barcode information. The test host transfers the barcode pattern to a barcode revealing apparatus for revealing the barcode pattern. The barcode identification apparatus reads the barcode pattern and resolves the barcode information carried by the barcode pattern, so as to generate an identification result. The test host acquires the identification result generated after the barcode identification apparatus reads the barcode pattern, and then determines whether the identification result matches the barcode information carried by the barcode pattern through comparison to generate a test result.

The test host repeats the above steps automatically, so that the testing procedure may be repeated without manual operations and data is collected for further analysis without manual operations.

Through the aforementioned test system and test method, the barcode identification apparatus is tested and data is collected automatically for further analysis without manual operations. In the present invention, data is collected without manual operations, so that the test of the present invention can be continuously repeated for a long period, and an amount of the collected data is increased, so as to facilitate complicated combinations of test variables.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
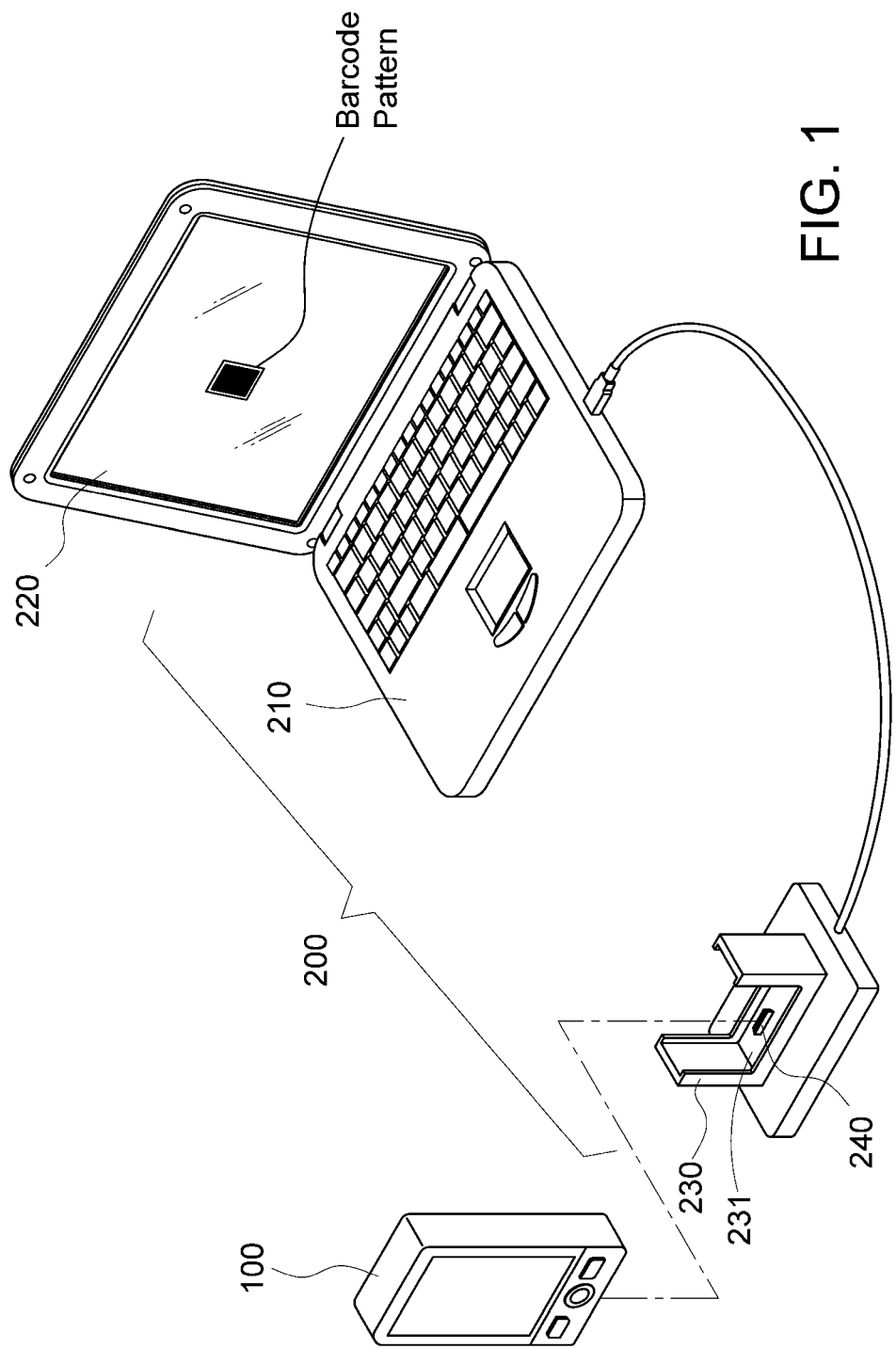
FIG. 1 is a perspective view of an automatic testing system according to an embodiment of the present invention.

Referring to FIG. 1, an automatic testing system 200 according to an embodiment of the present invention is shown, which is provided for testing a barcode identification apparatus 100. The automatic testing system 200 includes a test host 210, a barcode revealing apparatus 220, a fixing device 230, and a connecting interface 240.

Referring to FIG. 1, the test host 210 may be a desktop computer or a laptop computer for executing barcode pattern generation software. The test host 210 continuously generates new barcode patterns in a time sequence, or generates a barcode pattern after receiving an on-demand command and generates an output signal for displaying the barcode pattern.

The barcode pattern carries barcode information. The test host 210 generates a barcode pattern through random selection or designated barcode information. Next, the test host 210 generates an output signal containing the barcode pattern.

In this embodiment, the test host 210 and the barcode revealing apparatus 220 are a main body and a display device of a laptop computer, respectively. That is to say, after being installed with proper software to add new functions, the laptop computer can serve as the test host 210 and the barcode revealing apparatus 220 according to the embodiment of the present invention. The test host 210 may also be a desktop computer or an all-in-one computer. The barcode revealing apparatus 220 may be an independent display device (such as a flat panel display device) or a printing device electrically connected to the test host 210. Of course, the test host 210 is not limited to the IBM personal computer (PC) compatible computer and may also be a customized embedded system platform or an industrial computer, which is customized according to the requirements of the automatic testing system.

Referring to FIG. 1, the barcode revealing apparatus 220 is electrically connected to the test host 210 and used for receiving the output signal to display the barcode pattern. The output signal is a displaying signal which drives the barcode revealing apparatus 220 to display the barcode pattern on an image frame.

Figure 2:
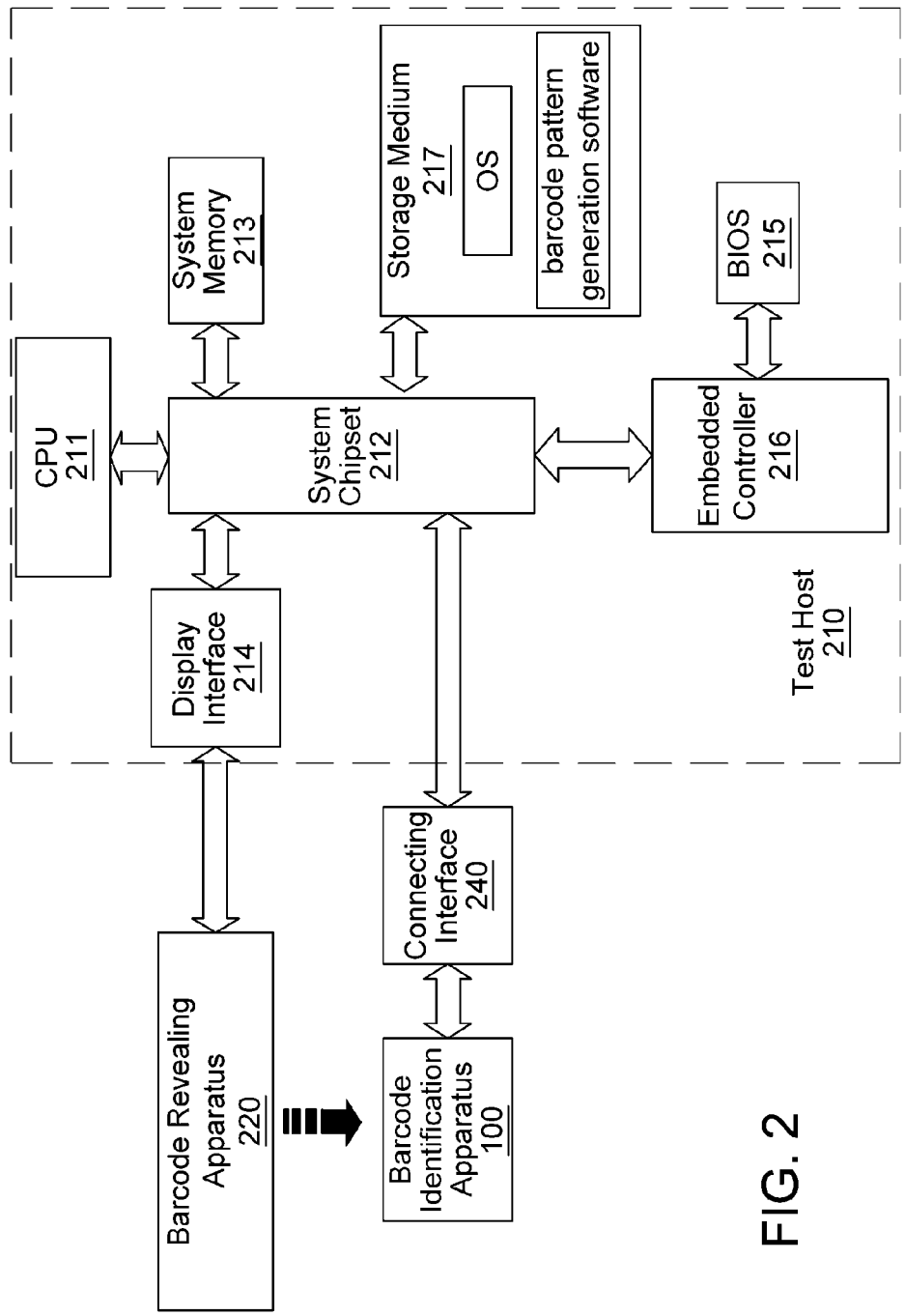
FIG. 2 is a block diagram of the automatic testing system according to the embodiment of the present invention.

Referring to FIG. 2, the electronic circuit of the test host 210 substantially includes a central processing unit (CPU) 211, a system chipset 212, a system memory 213, a display interface 214, a basic input/output system (BIOS) 215, an embedded controller 216, and storage medium 217. The CPU 211, the system memory 213, the display interface 214, the embedded controller 216, and the storage medium 217 are all electrically connected to the system chipset 212. Meanwhile, the connecting interface 240 is electrically connected to a bus provided by the system chipset 212, thereby connecting the connecting interface 240 and the CPU 211.

The storage medium 217 is used to store the operating system (OS) and the barcode pattern generation software. The CPU 211 loads the barcode pattern generation software to the system memory 213 from the storage medium 217 and executes the barcode pattern generation software, such that the test host 210 has the barcode pattern generation function. The CPU 211 outputs the displaying signal as the output signal to the barcode revealing apparatus 220 through the display interface 214, such that the barcode revealing apparatus 220 displays the barcode pattern.

Figure 3:
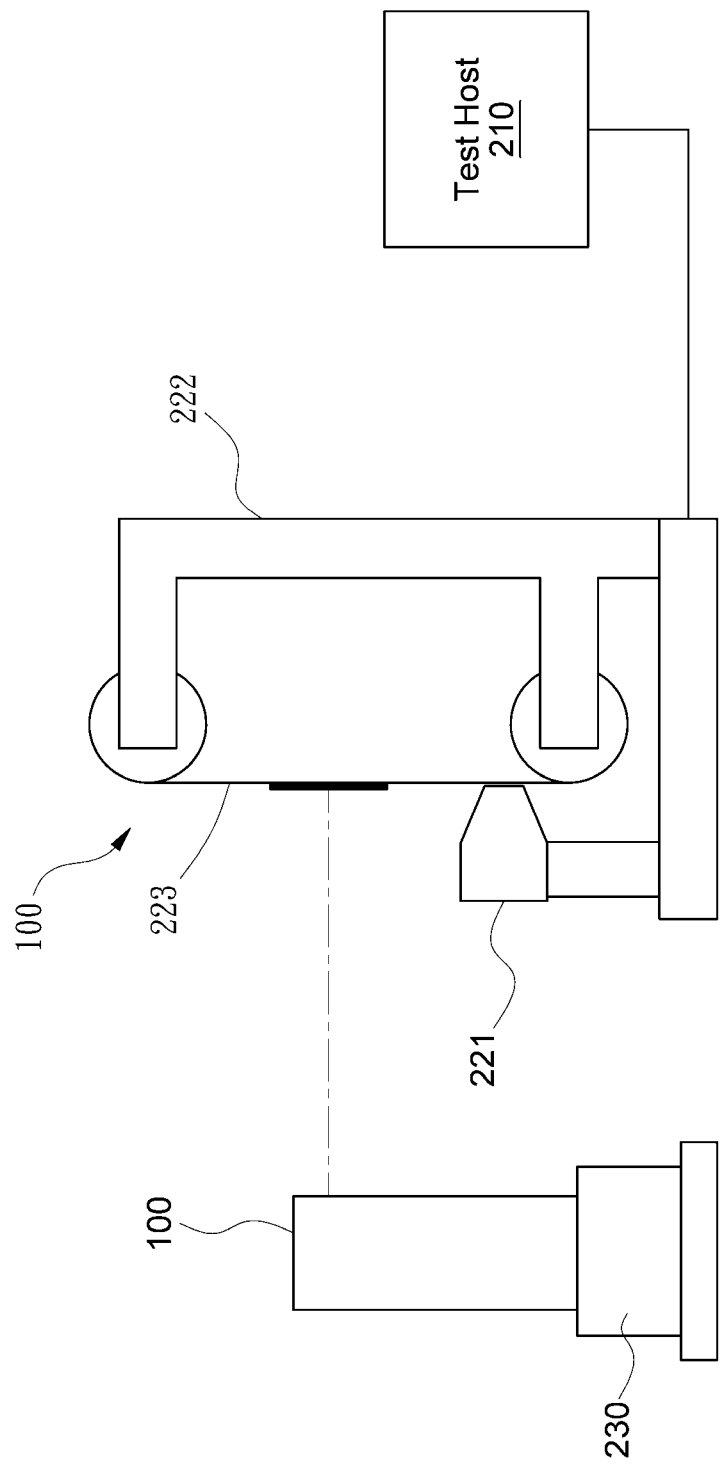
FIG. 3 is a lateral view of a variation of a barcode revealing apparatus according to an embodiment of the present invention.

Referring to FIG. 3, another embodiment of the barcode revealing apparatus 220 is shown. The barcode revealing apparatus 220 is provided for revealing the barcode pattern, and the barcode pattern is not limited to be revealed on a screen of a display device. In fact, the barcode pattern is usually put into practice as a printed matter on a paper sheet or on an article. Therefore, in another proffered embodiment, the barcode revealing apparatus 220 is a printing device for revealing the barcode pattern by printing the barcode pattern on a printing medium 223, so as to test a barcode reading capability of an optical barcode scanner. The barcode revealing apparatus 220 includes a print head 221 and a feeding device 222. The test host 210 uses the CPU 211 to convert the barcode pattern into a print control code as the output signal. Next, the test host 210 transfers the print control code to the barcode revealing apparatus 220 through a bus provided by the system chipset 212.

After receiving the print control code, the barcode revealing apparatus 220 drives the print head 221 to print the barcode pattern on the printing medium 223, for example, print the barcode pattern on a paper sheet, so as to reveal the barcode pattern. When the barcode reading process is ended or a next barcode pattern needs to be revealed, the feeding device 222 moves the printing medium 223 to remove the old barcode pattern and move the newly printed barcode pattern to a position that can be read by the barcode identification apparatus 100.

Referring to FIG. 1, the fixing device 230 has an accommodation portion 231 that matches configuration of a lower portion of the barcode identification apparatus 100. The connecting interface 240 is an electrical connector disposed in the accommodation portion 231 and is connected to the test host 210 through an electrical cable. The accommodation portion 231 of the fixing device 230 accommodates the barcode identification apparatus 100 and fixes the barcode identification apparatus 100 on the fixing device 230. The fixing device 230 fixes the barcode identification apparatus 100 and holds a relative position of the barcode identification apparatus 100 relative to the barcode revealing apparatus 220, such that the barcode identification apparatus 100 can read the barcode pattern revealed by the barcode revealing apparatus 220.

The connecting interface 240 is used to be plugged to the communication interface 160 of the barcode identification apparatus 100, so as to electrically connect the barcode identification apparatus 100 to the test host 210 through the electrical cable and establish communication between the barcode identification apparatus 100 and the test host 210.

In the above embodiment, the communication between the barcode identification apparatus 100 and the test host 210 is realized through wired communication. The communication between the barcode identification apparatus 100 and the test host 210 may also be wireless communication. For example, the communication is established through the IrDA Communication Protocol, the Bluetooth Communication Protocol, the 2.4 GHz Wireless Communication Protocol or a wireless local area network.

It should be noted that the fixing device 230 is not limited to the configuration as shown in FIG. 1 and may be an ordinary clamp which fixes the barcode identification apparatus 100 in a clamping mode and adjusts an angle of view of the barcode identification apparatus 100 when the barcode pattern is read.

Referring to FIG. 1, the barcode identification apparatus 100 may be a handheld operation device, for example, a personal digital assistant (PDA), a portable navigation device (PND) or a smart phone. The fixing device 230 in FIG. 1 is a cradle for carrying and fixing the above described handheld operation device.

Figure 4:
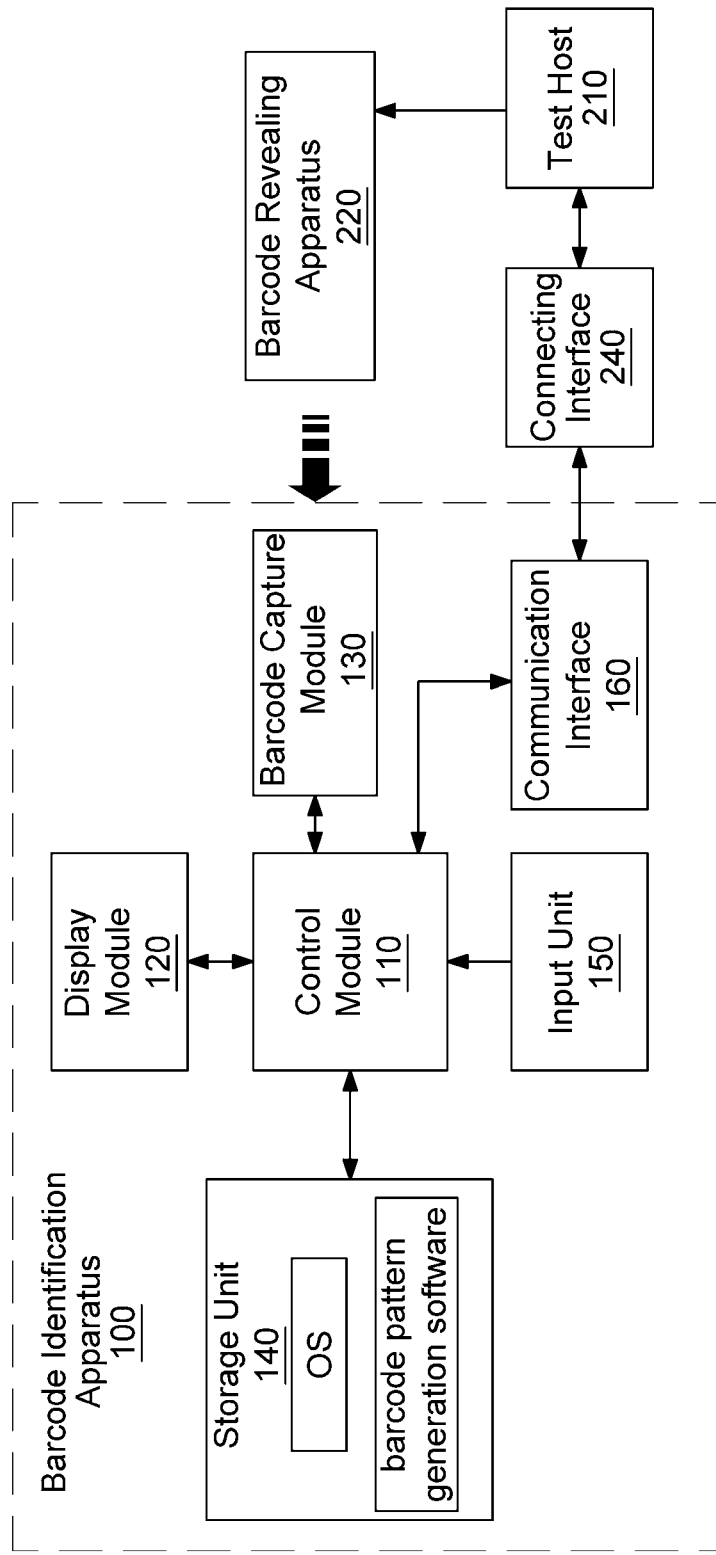
FIG. 4 is a block diagram the barcode identification apparatus according to the embodiment of the present invention.

Referring to FIG. 4, an electronic circuit of the barcode identification apparatus 100 at least includes a control module 110, a display module 120, a barcode capture module 130, a storage unit 140, an input unit 150, and a communication interface 160.

The control module 110 includes a processor, a system logic chip, and a display interface to process information. The above processor and system logic chip may be plural independent electronic components disposed on a circuit board, or the aforementioned electronic components can be integrated into one single System-On-Chip (SoC). Generally, the control module 110 of the handheld operation device is a System-On-Chip.

The display module 120 receives the displaying signal generated by the control module 110 through the display interface 214, so as to display an image frame. The barcode capture module 130 is electrically connected to the control module 110, so as to capture an image and transfer the image to the control module 110. The barcode capture module 130 may be a complementary metal-oxide-semiconductor (CMOS) or charge-coupled device (CCD), and preferably one having high pixels and an autofocus (AF) function, so as to clearly capture the image of the barcode pattern, and transfers the image of the barcode pattern to the control module 110. The control module 110 may control the display module 120 to display the barcode pattern or information corresponding to the barcode pattern.

The barcode capture module 130 may also be an ordinary barcode scanning module, which emits a scanning light (for example, red-light laser or light of a red-light light emitting diode (LED)) to the barcode pattern and receives a reflected light for the control module 110 to resolve the barcode information of the barcode pattern. In a situation that the computer host or embedded system platform serves as the barcode identification apparatus 100, the barcode capture module 130 may be an independently disposed assembly, which is connected to the barcode identification apparatus 100 through an electrical cable, and is directly or indirectly electrically connected to the control module 110. At this time, the fixing device 230 fixes the barcode capture module 130 only instead of fixing the entire barcode identification apparatus 100.

The storage unit 140 varies according to the types of the barcode identification apparatus 100. The storage unit 140 substantially includes program memory and storage memory. The program memory and the storage memory may be independent storage modules or one single module which is divided into a program memory block and a storage memory block. Taking the handheld operation device as an example, the program memory is usually a random access memory serving as a storage space for an operating system and barcode reading software, and serving as a space for the control module 110 to load and execute the barcode reader software, such that the barcode identification apparatus 100 has the barcode reading function. The storage memory is a built-in or plug-and-play NAND Flash memory for storing general data or ordinary program files which are not always loaded by resident programs. In an embodiment of the present invention, a handheld operation device is taken as an example for illustrating the barcode identification apparatus 100. If the barcode identification apparatus 100 is an ordinary personal computer, the program memory and the storage memory are respectively a system memory and a hard drive, and the operating system and important resident programs are installed and stored in the hard drive serving as the storage memory.

The input unit 150 is electrically connected to the control module 110 for sending an input instruction to the control module 110. The input unit 150 includes a plurality of keys and each key is designated with one or a plurality of input instructions. After being triggered, each key sends one or a plurality of corresponding input instructions.

The communication interface 160 is electrically connected to the control module 110 and used for electrically connecting the control module 110 to the test host 210. The communication interface 160 in this embodiment is a wired transmission module and provides an electrical connection port for plugging of the connecting interface 240 of the automatic testing system 200, such that the test host 210 communicates with the barcode identification apparatus 100. As described above, the test host 210 and the barcode identification apparatus 100 may be wireless transmission, so that the communication interface 160 may be an IrDA communication module, a Bluetooth communication module, a 2.4 Ghz wireless communication module or a wireless network module.

Referring to FIG. 4, before the test, the barcode identification apparatus 100 is fixed to the fixing device 230, such that the barcode capture module 130 is aligned with the area preset to display the barcode pattern on the barcode revealing apparatus 220, and the communication is established between the barcode identification apparatus 100 and the test host 210 through the connecting interface 240. Meanwhile, the barcode identification apparatus 100 also starts to execute the barcode reading function to continuously read the barcode pattern or read the barcode pattern after receiving an external command.

The test host 210 continuously executes the barcode pattern generation software, generates different barcode patterns in a time sequence, converts the images of the barcode patterns into displaying signals, and outputs the barcode patterns to the barcode revealing apparatus 220 through the displaying signals, such that the barcode revealing apparatus 220 reveals the barcode pattern.

After outputting the barcode pattern each time, the test host 210 starts to wait for a response from the barcode identification apparatus 100. If the barcode identification apparatus 100 is required to be triggered by the external command to start to execute the barcode reading function, the test host 210 is required to transfer a trigger signal to the barcode identification apparatus 100 when outputting the barcode pattern, such that the barcode identification apparatus 100 starts to read the barcode pattern to resolve the barcode information carried by the barcode pattern.

After reading the barcode pattern by using the barcode capture module 130, the barcode identification apparatus 100 analyzes the barcode pattern through the control module 110, so as to resolve the barcode information carried by the barcode pattern and generate an identification result which is output to the test host 210 through the communication interface 160.

After receiving the identification result output by the barcode identification apparatus 100, the test host 210 controls the barcode revealing apparatus 220 to stop displaying the barcode pattern, and then verifies the identification result. To verify the identification result, the text host 210 compares the identification result output by the barcode identification apparatus 100 and the barcode information carried by the barcode pattern, and generates a test result.

If the test host 210 determines that the identification result matches the barcode information carried by the barcode pattern after comparison, it is determined that the test result is a successful identification. If the test host 210 determines that the identification result does not matches the barcode information carried by the barcode pattern after comparison, the test result is a fail identification. The above test result is provided for the test host 210 to make statistics on the successful identification rate of barcode reading.

As described above, after generating the barcode pattern each time, the test host 210 performs time reckoning and starts to wait for the response from the barcode identification apparatus 100. If the barcode identification apparatus 100 does not send the barcode information after a threshold identifying time, the test host 210 stops outputting the barcode pattern and determines that the test result is a fail identification.

Figure 5A:
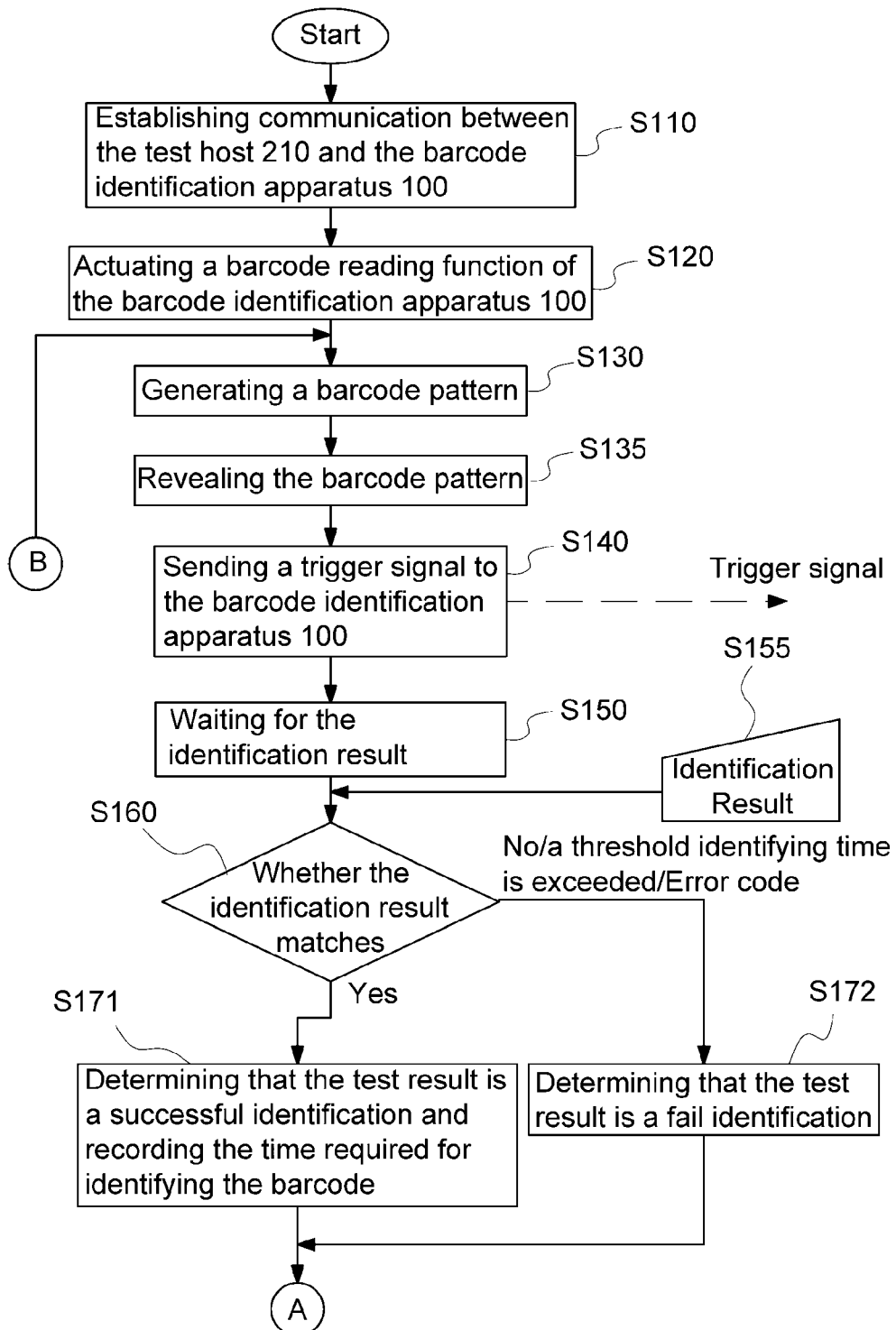
FIGS. 5A and 5B are flow charts of operations of the test host in the automatic testing method according to the present invention.
Figure 5B:
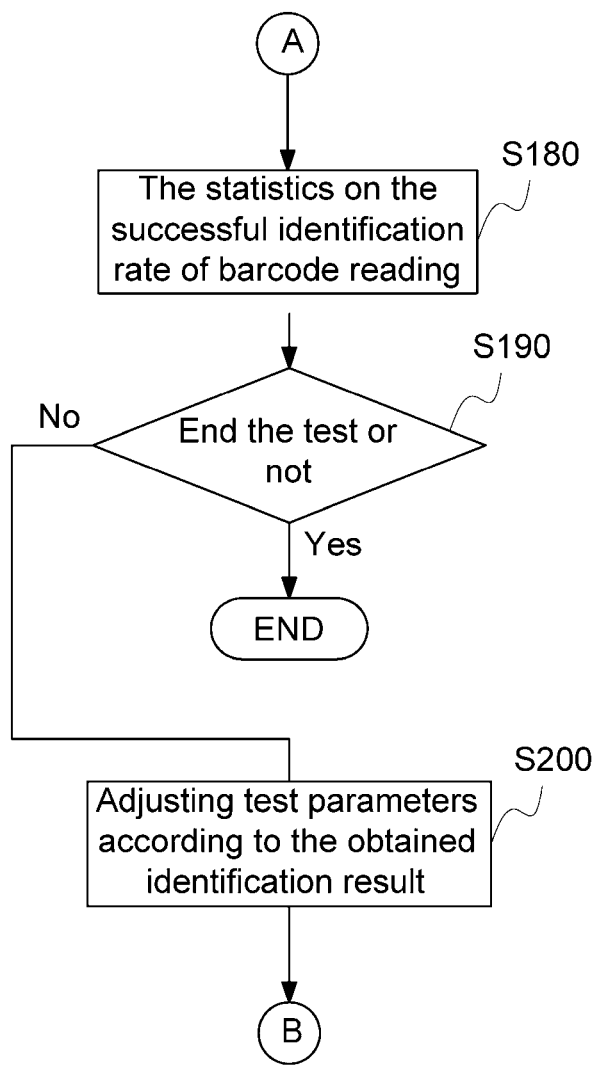

Referring to FIGS. 5A and 5B, the present invention further provides an automatic testing method of the barcode identification apparatus 100. The method is performed by the above described automatic testing system 200, so as to automatically test the barcode reading capability of the barcode identification apparatus 100. The automatic testing system 200 includes a test host 210, a barcode revealing apparatus 220, a fixing device 230, and a connecting interface 240.

When the test starts, the first step is to establish communication between the test host 210 and the barcode identification apparatus 100 (S110).

In Step S110, the user has to dispose the barcode identification apparatus 100 in the fixing device 230 to fix the barcode identification apparatus 100 and plug the connecting interface 240 of the test host 210 in the communication unit 160 of the barcode identification apparatus 100.

Meanwhile, the user has to adjust the barcode identification apparatus 100 to make the barcode capture module 130 of the barcode identification apparatus 100 to align with the barcode revealing apparatus 220 of the automatic testing system 200, so as to read the barcode pattern to be displayed. The barcode identification apparatus 100 has to execute the barcode reader software at the same time to actuate a barcode reading function of the barcode identification apparatus 100 (S120).

A sequence of Steps S110 and S120 is not limited. The barcode reading function of the barcode identification apparatus 100 may be firstly actuated (S120) and then the communication is established between the test host 210 and the barcode identification apparatus 100 (S110).

Next, the test host 210 executes the barcode pattern generation software and generates a barcode pattern carrying barcode information (S130).

The barcode pattern is selected according to one or a plurality of barcode types designated by the user. The test host 210 randomly selects a type of barcode by using the CPU 211, and randomly generates the barcode information matching the designated barcode type according to a barcode regulation. Finally, the test host 210 converts the barcode information into the barcode pattern. Of course, the user may determine a plurality of sets of barcodes in advance, and each barcode set includes a plurality of barcode patterns determined in advance. The test host 210 randomly selects one set of barcodes, and then randomly chooses a barcode pattern from the selected set of barcodes.

Next, the test host 210 transfers the barcode pattern to the barcode revealing apparatus 220 for revealing the barcode pattern by using the barcode revealing apparatus 220 (S135).

When the barcode revealing apparatus 220 is a display device, the test host 210 generates a displaying signal containing the barcode pattern to the barcode revealing apparatus 220, such that the barcode revealing apparatus 220 displays an image frame, and the barcode pattern is located in preset area on the image frame. When the barcode revealing apparatus 220 is a printing device, the test host 210 generates a print control code, such that the printing device prints the barcode pattern on printing medium 223 and moves the printing medium 223 to enable the barcode pattern to be moved to a preset position.

Through the communication, the test host 210 sends a trigger signal to the barcode identification apparatus 100 (S140), such that the barcode identification apparatus 100 reads the barcode pattern by using the barcode capture module 130, and resolves the barcode information carried by the barcode pattern through the barcode reader software executed by the control module 110, so as to generate an identification result which is output to the test host 210 (S155).

After sending the trigger signal, the test host 210 enters a wait state to wait for the identification result output by the barcode identification apparatus 100 (S150). After the barcode identification apparatus 100 finishes the barcode reading, the barcode identification apparatus 100 sends the identification result to the test host 210 through the communication link, such that the test host 210 acquires the identification result generated by the barcode identification apparatus 100. The identification result includes the barcode information obtained by resolving the barcode pattern and the time required for identifying the barcode.

After the test host 210 acquires the identification result, the test host 210 compares the identification result sent by the barcode identification apparatus 100 and the barcode information carried by the barcode pattern, and generates a test result according to whether the identification result matches the barcode information carried by the barcode pattern (S160). If the identification result matches the barcode information carried by the barcode pattern, the test host 210 determines that the test result is a successful identification and records the time required for identifying the barcode (S171). If the identification result does not match the barcode information carried by the barcode pattern, the test host 210 determines that the test result is a fail identification (S172). The above test result is used for the test host 210 to make statistics on the success rate of reading (S180).

After the test host 210 sends the trigger signal and enters the wait state, the test host 210 performs time reckoning. If the barcode identification apparatus 100 does not send the identification result when a threshold identifying time is exceeded, the test host 210 directly determines that the test result is a fail identification (S172). Alternatively, when the barcode identification apparatus 100 determines that the barcode pattern cannot be read (too blurred, unsupported barcode types, or the barcode information that still fails to be obtained when the threshold time is exceeded). The barcode identification apparatus 100 directly outputs an error code, and the test host 210 directly determines that the test result is a failure (S172).

Generally speaking, the steps of test procedure are performed repetitively to accumulate test data for statistical comparison. Therefore, before the test starts, the number of times of the test procedure to be performed or other conditions of ending the test are set in the test host 210. After the statistics on the successful identification rate of barcode reading is made (S180), the test host 210 determines whether to end the test or not (S190).

Commonly, a preset number of times of the test is set before the test, and the test host 210 determines whether the number of times of the test exceeds the preset number of times of the test. If the number of times of the test does not reach the preset number of times of the test, the test will not be ended. When the number of times of the test reaches the preset number of times of the test, the test is ended. Of course, other conditions of ending the test can also be set. For example, when the test result is a successful identification for a threshold number of times continuously, that is, the identification result matches the barcode information for a couple times of test procedures continuously, the test is ended.

Alternatively, when the test result is a fail identification for a threshold number of times continuously, that is, the identification result does not matches to the barcode information for a couple times of test procedures continuously, the test is ended.

Before a next test procedure of test is performed, the test host 210 adjusts test parameters according to the obtained identification result. For example, the last identification result or last several identification results or the statistic result of on the successful identification rate of barcode reading (S200). The object of adjusting the test parameters is to change variations of the barcode pattern that may occur when putting the barcode pattern into practice such as the size, print density, print contrast, defects of barcode pattern, and next the test process returns to Step S130 for a next cycle of test.

Figure 6:
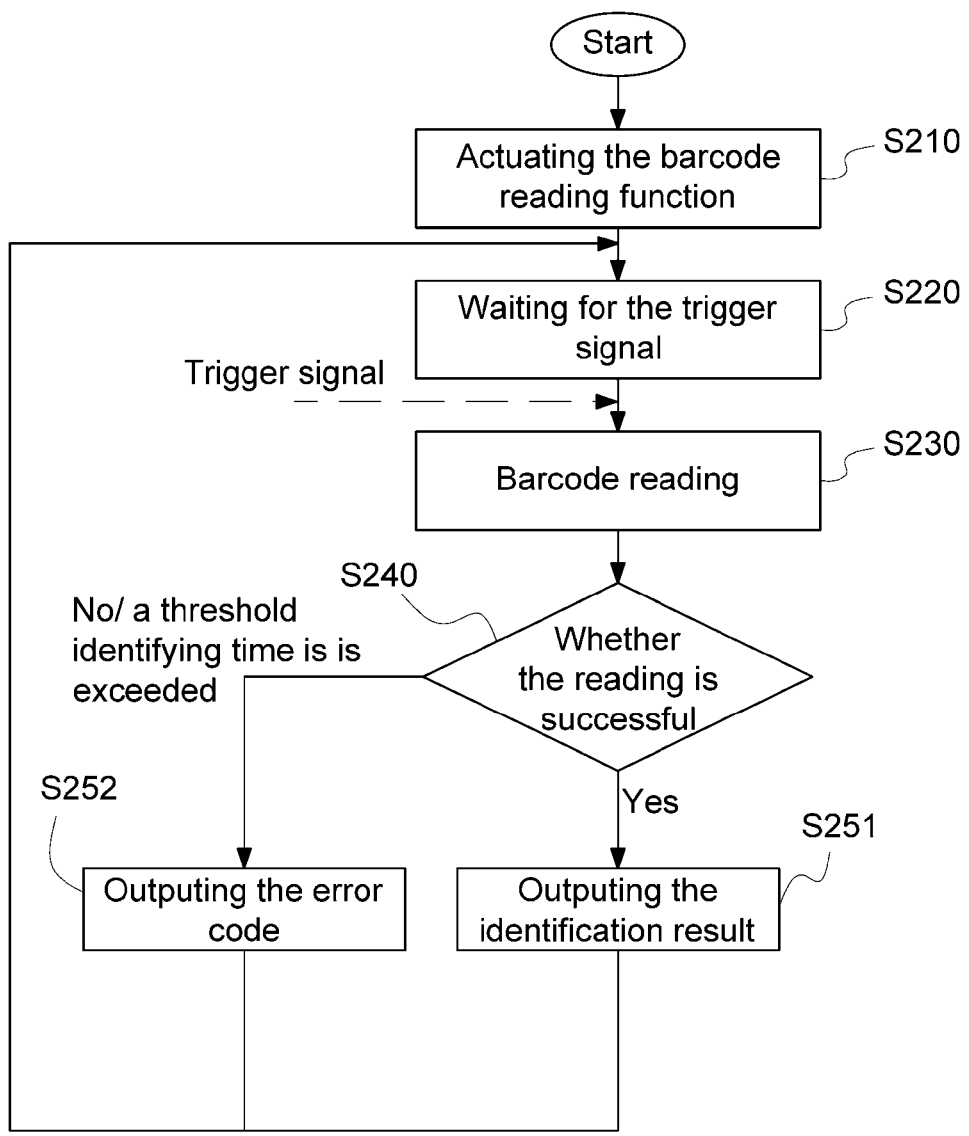
FIG. 6 is a flow chart of operations of the barcode identification apparatus in the automatic testing method according to the present invention.

FIG. 6 shows the process executed by the barcode identification apparatus 100 in the test method. As described above, the barcode identification apparatus 100 firstly establishes communication to the test host 210 and actuates the barcode reading function, for example, executes the barcode reader software (S210).

Next, the barcode identification apparatus 200 waits for the trigger signal sent by the test host 210 (S220). After receiving the trigger signal, the barcode identification apparatus 100 is triggered to start barcode reading (S230).

The barcode identification apparatus 100 receives the trigger signal through the communication interface 160, such that the barcode reading function is triggered and starts to be executed. At this time, the barcode identification apparatus 100 reads the barcode pattern through the barcode capture module 130, resolves the barcode information of the barcode pattern, and generates an identification result.

In the actual barcode reading, the barcode identification apparatus 100 is not able to acquire the identification result of each barcode pattern, so that the barcode identification apparatus 100 needs to determine whether the reading is successful or not (S240).

When the barcode reading is successful, the barcode identification apparatus 100 output the identification result including the barcode information and reading time directly to the test host 100 (S251).

When the barcode pattern is too blurred or is an unsupported barcode type of the barcode identification apparatus 100, the result that the reading is failed occurs and the barcode identification apparatus 100 outputs the error code to the test host 210 through the communication interface 160 (S252). As the error code is unable to match any barcode information, the test host 210 determines that the reading is failed. Similarly, the barcode identification apparatus 100 may also set a threshold identifying time. If the time for reading exceeds the threshold identifying time, the barcode identification apparatus 100 determines that the reading is failed and outputs the error code to the test host 210 as the identification result.

The reasons of exceeding the threshold identifying time are described as follows: the barcode resolving performance of the barcode identification apparatus 100 is too low, and more time is needed to resolve barcode information; the barcode revealing apparatus 220 does not display the barcode pattern; the barcode capture module 130 of the barcode identification apparatus 100 is not aligned with an output position of the barcode pattern. If the reading succeeds, the barcode identification apparatus 100 directly outputs the identification result.

It should be noted that only one of the barcode identification apparatus and the test host 210 is set with the threshold identifying time, and the barcode identification apparatus and the test host 210 are not set at the same time, so as to avoid conflicts of system events caused by that the test host 210 receives the error code as the identification result after determining that the reading is failed because the test host 210 does not receive the identification result.

Through Step S200 of adjusting the test parameters, the test method of the present invention may be adopted to test the capability in every aspect of the barcode identification apparatus 100 in addition to making statistics on the identification result. The capability in every aspect of the barcode identification apparatus 100 is described as follows.

(1) Barcode reading capability: After the test host 210 receives the identification result each time (including the barcode information and the reading completion time), the test host 210 adjusts the refresh rate of generating a new barcode pattern according to whether the barcode information is correct and the reading completion time, thereby finding out the time required by the barcode identification apparatus 100 to correctly read each barcode pattern, so as to evaluate the barcode reading capability of the barcode identification apparatus 200.

(2) Single-item test: The barcode pattern has a plurality of parameters that can be adjusted, which includes a size of barcode pattern and barcode pattern persisting time in addition to the refresh rate of generating a new barcode pattern. Through the step of automatically adjusting the test parameters, the test host 210 may change a single parameter one by one and fix other parameters, so as to obtain a test result for a certain item.

(3) Random test: For a barcode identification apparatus 100 which can read multiple barcode types, the user can predetermine plural barcode types in advance. The test host 210 randomly selects one of the barcode types and then randomly generates a corresponding barcode pattern. Alternatively, the test host 210 selects a barcode type in a cyclic mode from the plurality of barcodes types designated by the user and then randomly generates the barcode pattern.

(4) Environment test: The test host 210 generates the barcode pattern, and then changes the brightness, contrast, color cast, and density of the barcode pattern according to the set environment conditions (usually a status of a background light source), so as to simulate variations of the barcode pattern under the influence of the background light source, so as to test the reading capability of the barcode identification apparatus 100 in environments having different brightness.

(5) Angle-of-view test: In general applications, the user cannot ensure that the barcode capture module 130 of the barcode identification apparatus 100 is aligned with the barcode pattern. Therefore, when outputting the signal to the barcode revealing apparatus 220, the test host 210 may distort the barcode pattern to simulate variations of a relative angle and distance between the barcode identification apparatus 100 and the barcode revealing apparatus 220, thereby verifying the reading capability of the barcode identification apparatus 100 for skewed barcode patterns.

(6) Fault-tolerance test: After generating the barcode pattern, the test host 210 may add noises in the barcode pattern to destroy part of the barcode pattern, so as to verify the reading capability of the barcode identification apparatus 100 when noises exist (that is, the barcode pattern has defects).

Through the above automatic testing system 200 and the automatic testing method, the user can accumulate the test data of the barcode identification apparatus 100 rapidly and even alter the test parameters in real time by using the test host 210, so that the user can find out the characteristics of the barcode identification apparatus 100 rapidly, thereby improving the barcode identification apparatus.

While the present invention has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An automatic testing system for testing a barcode identification apparatus, comprising:
   a barcode revealing apparatus, for displaying a sequence of barcode patterns, each carrying a corresponding barcode information;
   a barcode identification apparatus, for reading the sequence of barcode patterns and resolving the respective corresponding barcode information carried by each barcode pattern to output a corresponding identification result; and
   a test host, configured to generate the sequence of barcode patterns wherein the sequence of barcodes is configured by the test host to test a capability of the barcode identification apparatus under at least one test condition, to output the sequence of barcode patterns to the barcode revealing apparatus, to receive each corresponding identification result output by the barcode identification apparatus, to verify each corresponding identification result and generate a corresponding test result, to generate a statistical success rate of correctly resolving the corresponding barcode information of the sequence of barcode patterns by the barcode identification apparatus according to the test condition and the corresponding test results, and to adjust a parameter of the condition according to the statistical success rate before outputting a next barcode pattern following the sequence of barcode patterns.

2. The automatic testing system as claimed in claim 1, wherein the test host continuously generates the sequence of barcode patterns in a time sequence.

3. The automatic testing system as claimed in claim 1, wherein the test host generates the sequence of barcode patterns after receiving an on-demand command.

4. The automatic testing system as claimed in claim 1, wherein the test host generates the sequence of barcode patterns based on random selection.

5. The automatic testing system as claimed in claim 1, wherein the barcode revealing apparatus is a display device, and the output signal is a displaying signal for driving the display device to display the sequence of barcode patterns.

6. The automatic testing system as claimed in claim 1, wherein the barcode revealing apparatus is a printing device for displaying the sequence of barcode patterns by printing each barcode pattern on a printing medium.

7. The automatic testing system as claimed in claim 1, further comprising a connecting interface for establishing communication between the barcode identification apparatus and the test host.

8. The automatic testing system as claimed in claim 7, further comprising a fixing device for fixing the barcode identification apparatus and holding a relative position of the barcode identification apparatus relative to the barcode revealing apparatus.

9. The automatic testing system as claimed in claim 8, wherein the fixing device comprises an accommodation portion for accommodating the barcode identification apparatus, and the connecting interface is an electrical connector disposed in the accommodation portion for being plugged to the barcode identification apparatus and being connected to the test host through an electrical cable.

10. The automatic testing system as claimed in claim 1, wherein communication between the barcode identification apparatus and the test host is wireless communication.

11. The automatic testing system as claimed in claim 1, wherein the test host transfers a trigger signal to the barcode identification apparatus after outputting each of the sequence of barcode patterns, such that the barcode identification apparatus starts to read each barcode pattern to resolve the corresponding barcode information carried by the barcode pattern in sequence.

12. An automatic testing method for testing a barcode identification apparatus, comprising the steps of:
   establishing communication between a test host and the barcode identification apparatus;
   by the test host, generating a sequence of barcode patterns, each carrying a corresponding barcode information, wherein the sequence of barcodes is configured by the test host to test a capability of the barcode identification apparatus under at least one test condition;
   displaying the sequence of barcode patterns by a barcode revealing apparatus;
   by the barcode identification apparatus, reading each of the sequence of barcode patterns and resolving the corresponding barcode information carried by each barcode pattern to generate a corresponding identification result;
   receiving each corresponding identification result generated by the barcode identification apparatus by the test host;
   by the test host, comparing each corresponding identification result and an actual barcode information carried by each of the sequence of barcode patterns, and generating a corresponding test result according to whether the corresponding identification result matches the actual barcode information carried by the barcode pattern; and
   by the test host, generating a statistical success rate of correctly resolving the corresponding barcode information of the sequence of barcode patterns by the barcode identification apparatus according to the test condition and the corresponding test results; and
   by the test host, adjusting a parameter of the test condition according to the statistical success rate before outputting a next barcode pattern following the sequence of barcode patterns.

13. The automatic testing method as claimed in claim 12, wherein the step of establishing the communication between the test host and the barcode identification apparatus comprises:
   disposing the barcode identification apparatus in a fixing device to fix the barcode identification apparatus;

plugging a connecting interface, which is electrically connected to the test host, to the barcode identification apparatus; and aligning a barcode capture module of the barcode identification apparatus with the barcode revealing apparatus to read the barcode pattern to be displayed.

14. The automatic testing method as claimed in claim 12, further comprising a step of determining that the corresponding test result is a successful identification when the corresponding identification result matches the actual barcode information carried by the barcode pattern, or determining that the test result is a fail identification when the corresponding identification result does not match the actual barcode information carried by the barcode pattern.

15. The automatic testing method as claimed in claim 12, further comprising a step of sending a trigger signal to the barcode identification apparatus to activate the barcode identification apparatus to read and resolve the sequence of barcode patterns and output the corresponding identification results.

16. The automatic testing method as claimed in claim 15, further comprising steps of:
performing time reckoning after the sending the trigger signal to the barcode identification apparatus; and
if the barcode identification apparatus does not send the corresponding identification result when a threshold identifying time is exceeded, determining, determining that the test result is a fail identification by the test host.

17. The automatic testing method as claimed in claim 16, wherein the steps recited in claims 12, 15 and 16 are performed repetitively, and the test is ended when the test result is a successful identification for a threshold number of times continuously.

18. The automatic testing method as claimed in claim 16, wherein the steps recited in claims 12, 15 and 16 are performed repetitively, and the test is ended when the test result is a fail identification for a threshold number of times continuously.

19. The automatic testing method as claimed in claim 12, wherein the steps are performed repetitively, and the test is ended when a number of times of the test reaches a preset number of times of the test.

20. The automatic testing system as claimed in claim 1, wherein the at least one test condition is selected from refresh rate, size, barcode type variation, environmental light condition, angle of view, and noise.

21. The automatic testing method as claimed in claim 12, wherein the at least one test condition is selected from refresh rate, size, barcode type variation, environmental light condition, angle of view, and noise.

* * * * *